United States Patent [19]

Shimada et al.

[11] Patent Number: 4,620,875

[45] Date of Patent: Nov. 4, 1986

[54] AQUEOUS INK COMPOSITION

[75] Inventors: Masaru Shimada, Shizuoka; Masaomi Sasaki, Susono, both of Japan

[73] Assignee: Ricoh Company, Ltd., Tokyo, Japan

[21] Appl. No.: 719,451

[22] Filed: Apr. 3, 1985

[30] Foreign Application Priority Data

Apr. 10, 1984 [JP] Japan ................................. 59-70135
Apr. 10, 1984 [JP] Japan ................................. 59-70139

[51] Int. Cl.[4] ............................................ C09D 11/02
[52] U.S. Cl. .................................................... 106/22
[58] Field of Search .......................................... 106/22

[56] References Cited

U.S. PATENT DOCUMENTS 3,846,141 11/1974 Ostergren et al. .............. 106/22
4,141,889 2/1979 Allan .................................. 534/839
4,242,258 12/1980 Noll et al. ......................... 534/736

Primary Examiner—Amelia B. Yarbrough
Attorney, Agent, or Firm—Oblon, Fisher, Spivak, McClelland & Maier

[57] ABSTRACT

An aqueous ink composition is disclosed, which comprises at least: (1) 0.5 to 30 parts by weight of a dye having the formula of

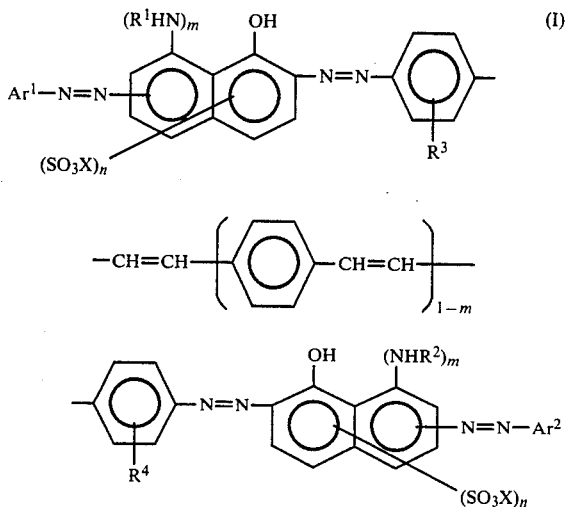

wherein $R^1$ and $R^2$ each represent hydrogen, an alkyl group, a phenyl group, an acyl group an acetyl group or a phenylsulfonyl group, $R^3$ and $R^4$ each represent hydrogen, an alkyl group, an alkoxy group, halogen, a sulfonic acid group, X represents hydrogen, Na, K, Li or an organic amine cation, m is an integer of 0 or 1; and when m is an integer of 0, n is an integer of 1, and $Ar^1$ and $Ar^2$ each represent a substituted phenyl group, a substituted naphthyl group or ($R^6$ represents an alkyl group, a phenyl group, a substituted phenyl group, a cyano group, an alkoxy group, a carboxyl group or a carbamoyl group, and $R^7$ represents a substituted phenyl group or a substituted naphthyl group) and when m is an integer of 1, n is an integer of 1 or 2 and $Ar^1$ and $Ar^2$ each represent an unsubstituted or substituted phenyl group or naphthyl group; (2) 5 to 30 parts by weight of a humectant; and (3) water.

5 Claims, No Drawings

AQUEOUS INK COMPOSITION

BACKGROUND OF THE INVENTION

The present invention relates to an aqueous ink composition suitable for use as printing ink and stamping ink in general use, and for use with writing instruments, recording apparatus or the like. More particularly, it relates to an aqueous black ink composition for ink-jet printing, which is capable of yielding printed images with high quality (i.e., high clearness and sharpness, etc.), and with excellent resistance to water and light, and which is also capable of providing stable ink ejection, without causing the plugging of the nozzles of the ink-jet printing apparatus, even if it is used continuously for a long period of time or it is used intermittently after a period of non-use of the ink-jet printing apparatus.

As the dyes for use in the conventional black aqueous inks, for example, direct dyes such as C.I. Direct Black $-2$, $-4$, $-17$, $-19$, $-22$, $-33$, $-38$, $-51$, $-56$, $-62$, $-71$, $-74$, $-75$, $-77$, $-105$, $-108$, $-112$ and $-154$; and acid dyes such as C.I. Acid Black $-1$, $-2$, $-7$, $-24$ and $-94$ are employed in practice.

Of the above-mentioned dyes for the conventional aqueous inks, the solubility of the direct dyes in the solvent of the aqueous inks is so low that the content of the dye in the inks cannot be increased. The result is that the inks cannot provide images having high density and high contrast. Furthermore, even if the concentration of the direct dye in the inks is held down, the dye precipitates from the inks during an extend period of storage, or during the periods when the ink-jet printing apparatus is not in use. As a result, the nozzles are plugged with the precipitates and it becomes impossible to obtain the desired ink ejection stability and the desired ink ejection response.

The conventional acid dyes have a higher solubility in the solvent of the aqueous inks as compared with the above-mentioned direct dyes. However, images printed by the aqueous inks employing the conventional acid dyes are not resistant to water and exposure to light and therefore are poor in preservability.

SUMMARY OF THE INVENTION

It is therefore an object of the present invention to provide an aqueous black ink composition for ink-jet printing which does not result in plugging of the nozzles, and does not change in quality or separate precipitates therefrom during storage, but exhibits excellent ink-ejection stability, and has good ink ejection response, shows slight changes in physical properties, if any, when used for a long period with continuous recirculation, or when used intermittently, and, yields printed images which are non-spreading, and have superior water resistance, high sharpness, and high image density.

According to the present invention, the above object can be attained by an aqueous black ink composition for ink-jet printing comprising at least one dye having the following formula, water and a humectant:

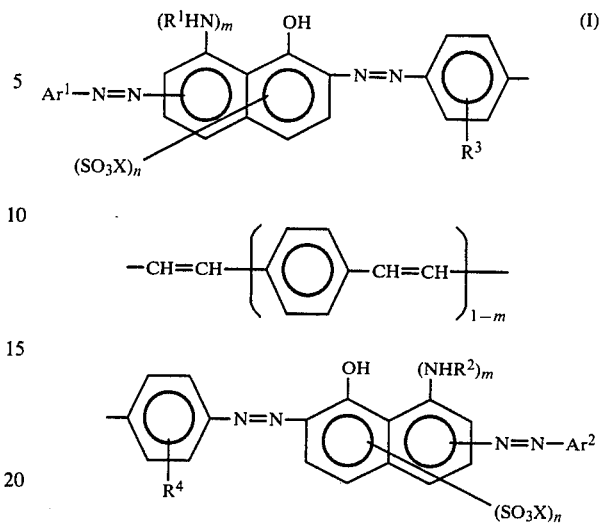

wherein $R^1$ and $R^2$ each represent hydrogen, an alkyl group, a phenyl group, an acyl group an acetyl group or a phenylsulfonyl group, $R^3$ and $R^4$ each represent hydrogen, an alkyl group, an alkoxy group, halogen, a sulfonic acid group, X represents hydrogen, Na, K, Li or an organic amine cation, m is an integer of 0 or 1; and when m is an integer of 0, n is an integer of 1, and $Ar^1$ and $Ar^2$ each represent a substituted phenyl group, a substituted naphthyl group or

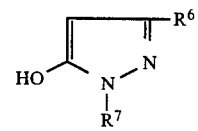

($R^6$ represents an alkyl group, a phenyl group, a substituted phenyl group, a cyano group, an alkoxy group, a carboxyl group or a carbamoyl group, and $R^7$ represents a substituted phenyl group or a substituted naphthyl group) and when m is an integer of 1, n is an integer of 1 or 2 and $Ar^1$ and $Ar^2$ each represent an unsubstituted or substituted phenyl group or naphthyl group.

DETAILED DESCRIPTION OF THE PREFERRED EMBODIMENTS

In the present invention, it is preferable that the dye of the above described formula (I) be contained in an amount of 0.5 to 30 parts by weight, more preferably in an amount of 1.5 to 6 parts by weight, with respect to 100 parts by weight of the ink composition according to the present invention. When the amount of the dye is less than 0.5 part by weight, the dye does not sufficiently work as a colorant, while when the amount of the dye exceeds 30 parts by weight, it precipitates during an extended period of continuous use and storage, or during the periods when the ink-jet printing apparatus is not in use. As a result, the nozzles are plugged with the precipitates and it becomes impossible to eject the ink droplets from the nozzles.

Specific examples of the dyes represented by the formula (I) when m=0 are as follows:

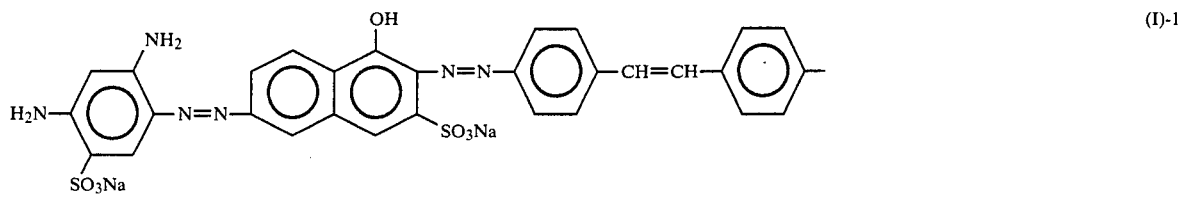
(I)-1
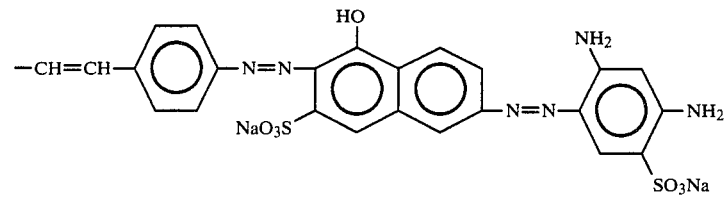
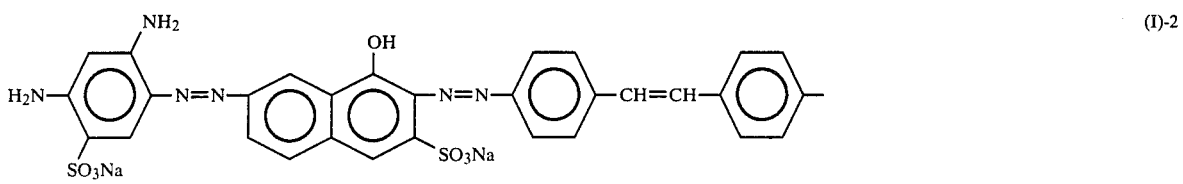
(I)-2
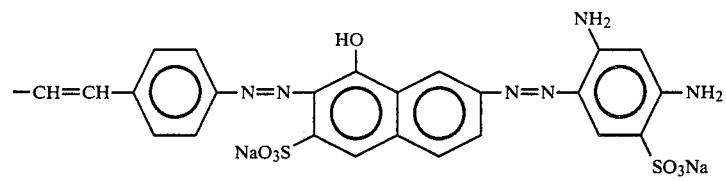
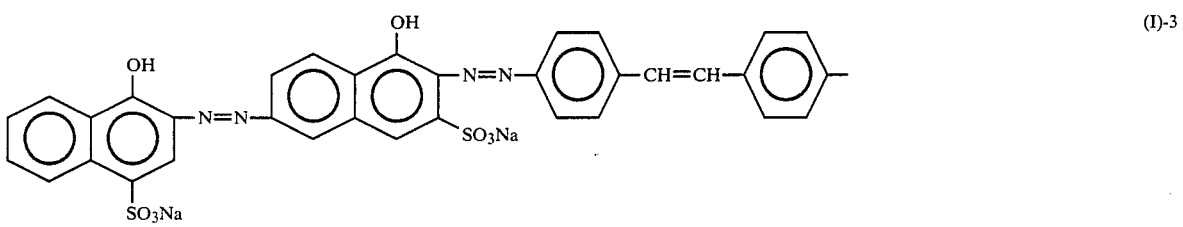
(I)-3
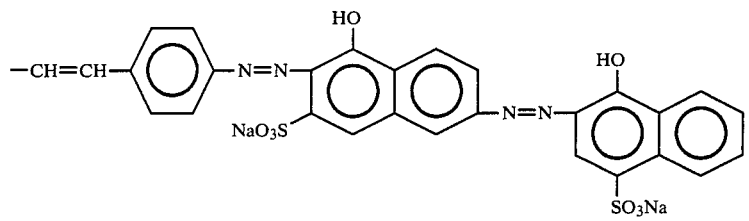
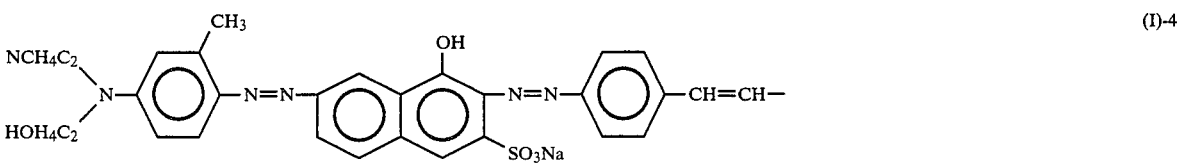
(I)-4
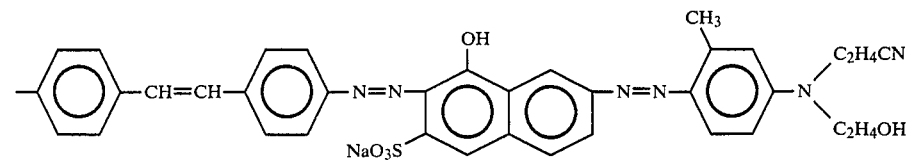

-continued
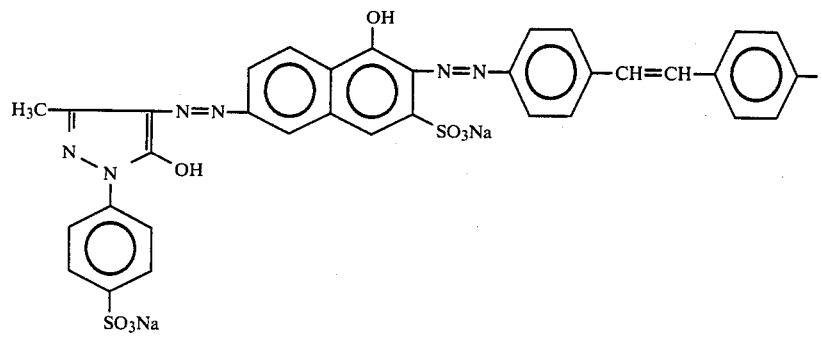
(I)-5
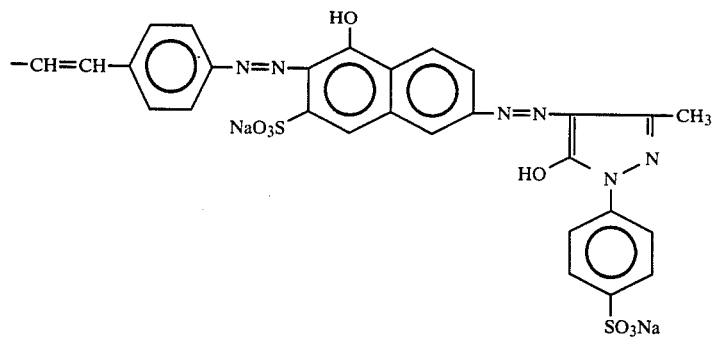
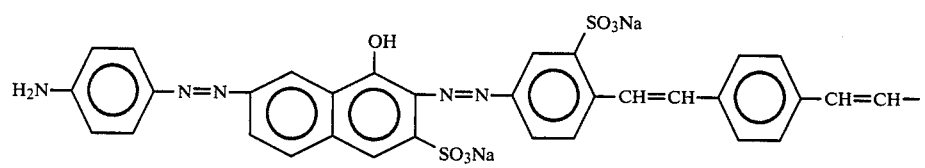
(I)-6
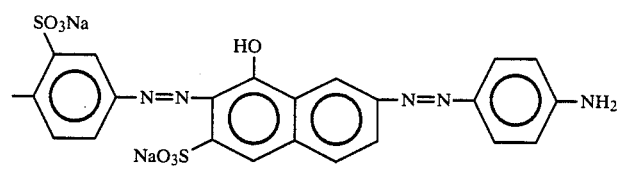
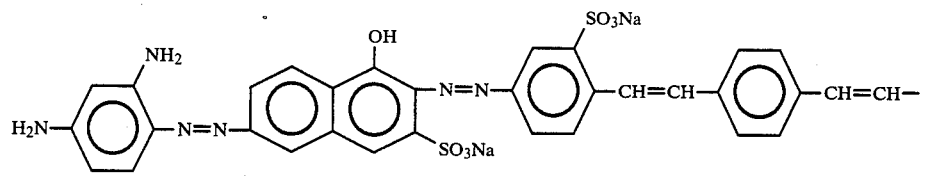
(I)-7
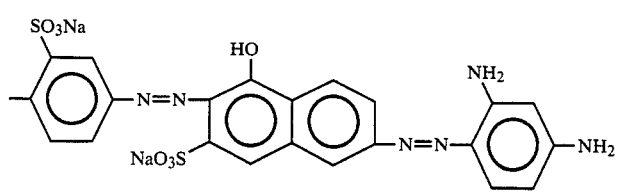

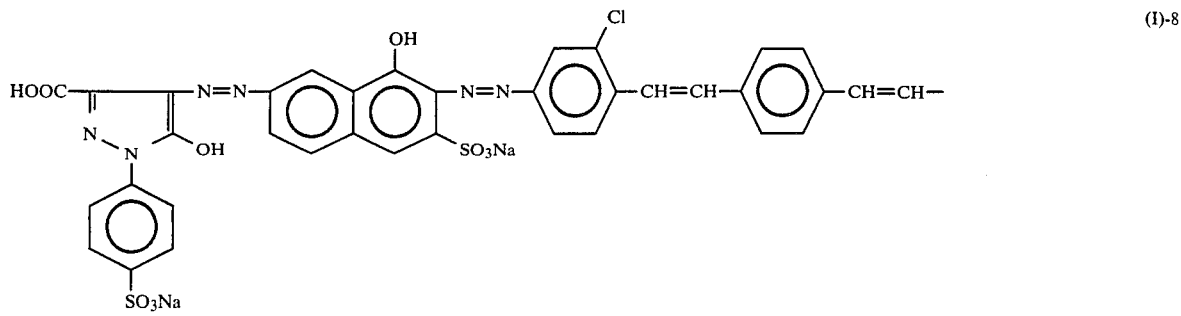
(I)-8
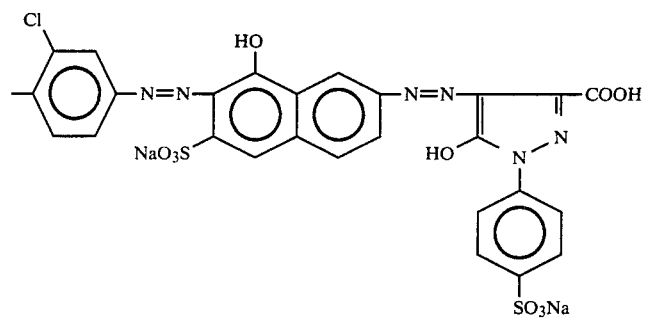
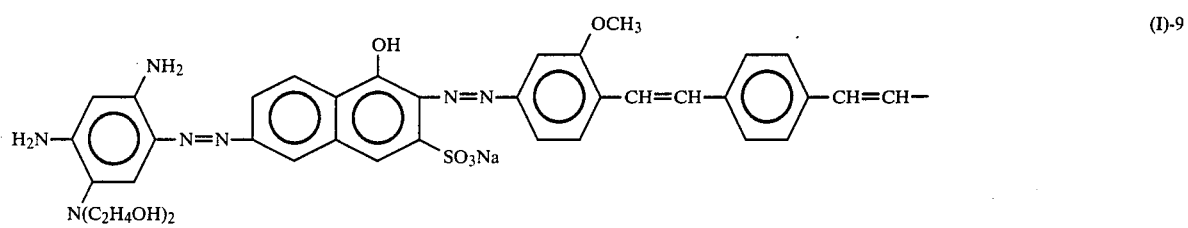
(I)-9
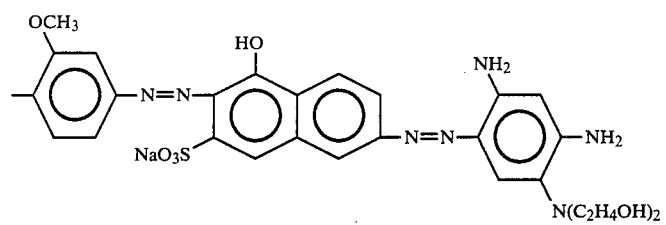
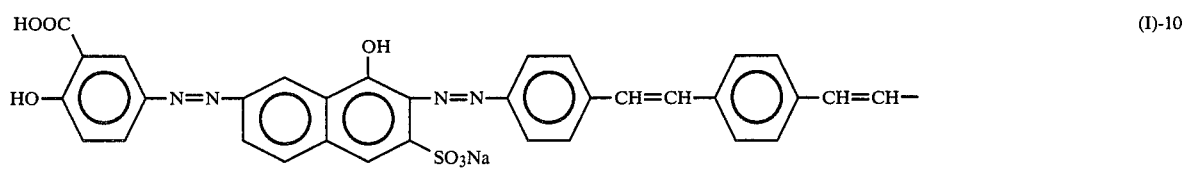
(I)-10
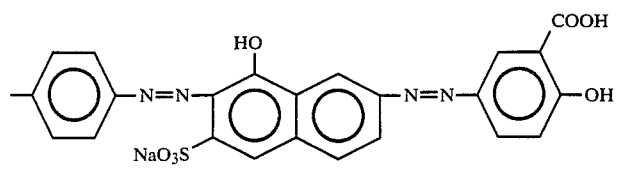

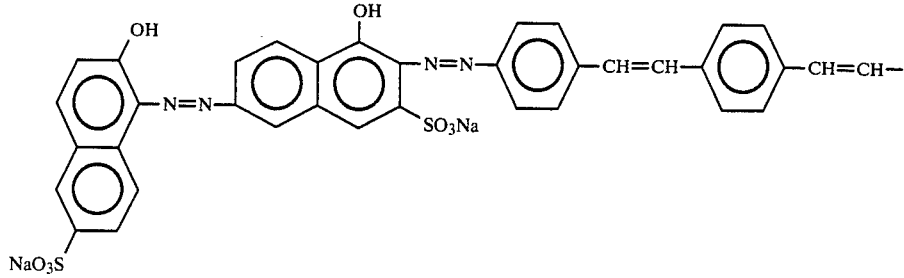

(I)-11

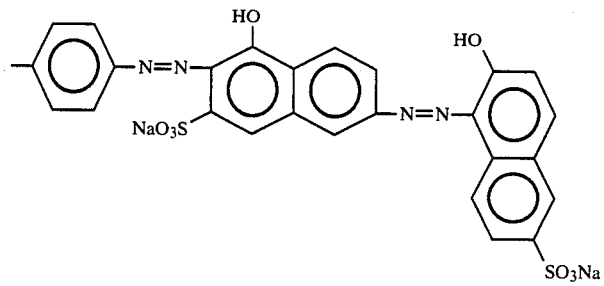

The above dyes can be synthesized without difficulty. For example, the dye (1)-1 can be synthesized as follows:

[SYNTHESIS OF DYE (1)-1]

4.8 g of J-acid (2-amino-5-naphthol-7-sulfonic acid) is dissolved in 150 ml of a 1% aqueous solution of NaOH. To this solution, 1.5 g of $NaNO_2$ is added. The thus prepared J-acid solution is dropwise added to 200 ml of a 5% aqueous solution of HCl, with stirring, so as to maintain the mixture at temperatures below 5° C., whereby the J-acid is diazotized. After continuing the reaction for 2 hours, sulfamic acid is added to the reaction mixture to decompose an excess of nitrous acid present in the reaction mixture.

To this mixture, 3.8 g of 2,4-diaminobenzene sulfonic acid is added. Upon addition of the sulfonic acid, the diazonium salt of J-acid is coupled with 2,4-diaminobenzene sodium sulfonate, so that a red monoazo dye is formed. After continuation of the coupling reaction for 3 hours, the monoazo dye is filtered off and is then dissolved in 150 ml of a 10% aqueous solution of $Na_2CO_3$.

Apart from the above, 3.0 g of 1,4-bis(4'-aminostyryl)benzene is tetra-azotized in a conventional method. The reaction mixture of the tetra-azotized 1,4-bis(4'-aminostyryl)benzene is slowly added, with stirring, to the above prepared alkali solution of the monoazo dye, with the reaction mixture maintained at temperatures below 10° C., and the reaction is continued for 3 hours. After filtering off impurities and unreacted components from the reaction mixture, the reaction mixture is made acidic by addition of hydrochloric acid. A black dye separates from the reaction mixture. The separated black dye is filtered off, rinsed with 80 ml of a 80% aqueous solution of ethanol two times and dried, whereby the black dye (1)-1 is obtained with a yield of 8.5 g.

Specific examples of the dyes represented by the formula (I) when m=1 are as follows:

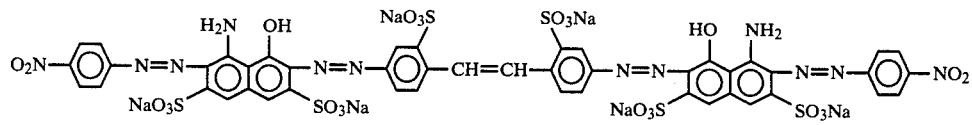

(2)-1

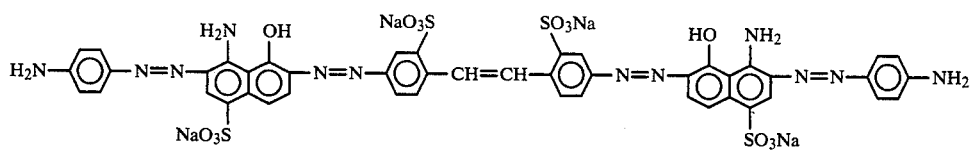

(2)-2

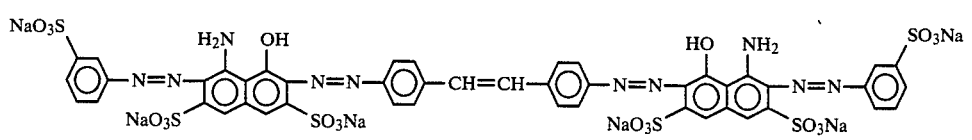

(2)-3

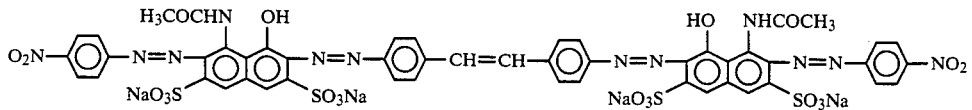

(2)-4

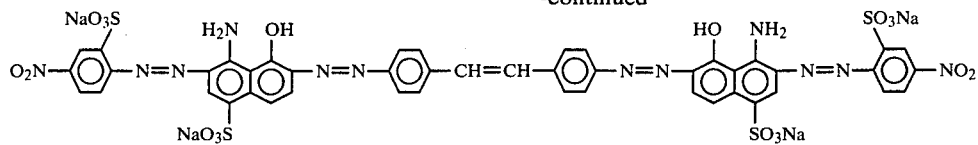
(2)-5

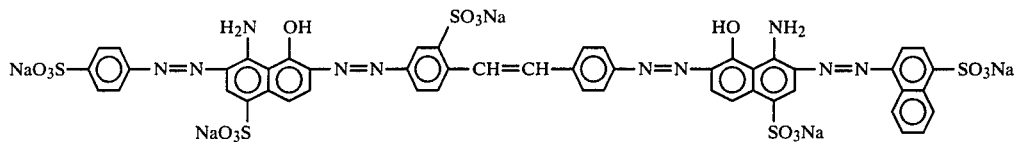
(2)-6

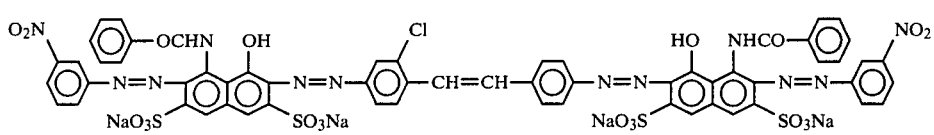
(2)-7

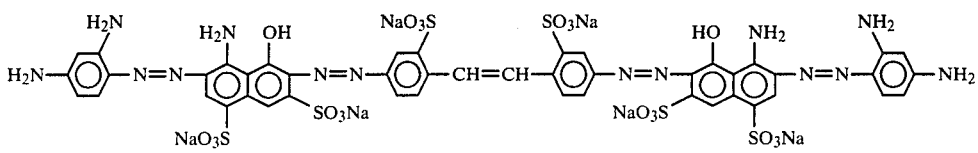
(2)-8

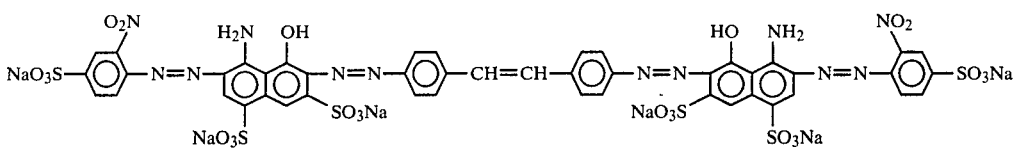
(2)-9

(2)-10

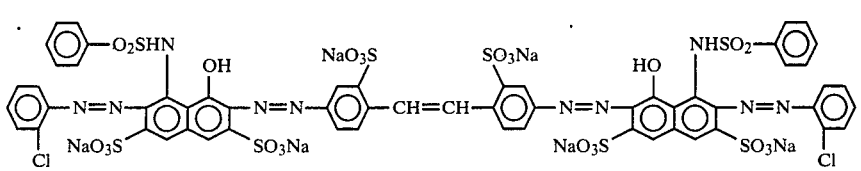

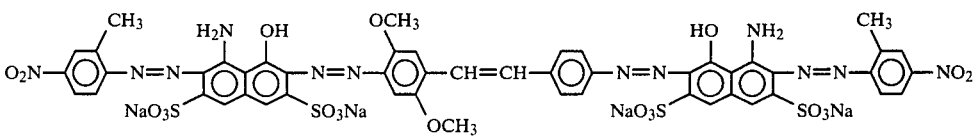
(2)-11

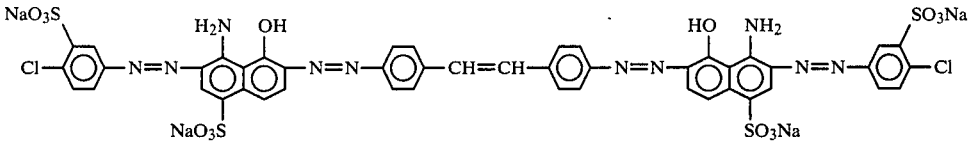
(2)-12

The above dyes can be synthesized without difficulty. For example, the black dye (2)-1 can be synthesized as follows:

SYNTHESIS OF DYE (2)-1

18 g of H-acid (1-amino-8-naphthol-3,6-disulfonic acid) is dissolved in an aqueous solution of $Na_2CO_3$ consisting of 3.0 g of $Na_2CO_3$ and 500 ml of water. 20 ml of conc. HCl is added to the above solution to make it acidic. To this solution, 12.0 g of p-nitrobenzene diazonium $BF_4$ salt powder is added, with vigorous stirring. After a while, a red monoazo dye separates from the reaction mixture. After continuation of the reaction for 3 hours, the separated red monoazo dye is filtered off and is then dissolved in 500 ml of a 10% aqueous solution of $Na_2CO_3$.

Apart from the above, 7.4 g of 4,4'-diaminostilbene-2,2'-disulfonic acid is tetra-azotized in a conventional method. The reaction mixture of the tetra-azotized 4,4'-diaminostyrylbene-2,2'-disulfonic acid is slowly added, with stirring, to the above prepared alkali solution of the monoazo dye, with the reaction mixture maintained at temperatures below 10° C., and the reaction is proceeded for 3 hours. After filtering off impurities and unreacted components from the reaction mixture, the reaction mixture is made acidic by addition of hydrochloric acid. Upon addition of hydrochloric acid, a black dye separates from the reaction mixture. The separated black dye is filtered off, rinsed with 200 ml of a 80% aqueous solution of ethanol two times and dried, whereby the black dye (2)-1 is obtained with a yield of 26.8 g.

The aqueous inks using the above listed dyes have color tones of blue-black to black. Pure black inks can be prepared by combining the aqueous ink using the above listed dyes with red inks and/or yellow inks or red dyes and/or yellow dyes in an effective amount.

As the dyes for such red inks, for example, the following can be employed: C.I. Direct Red 9, 37, 63, 75, 79, 80, 81, 83, 99, 220, 224, 225, 243, 254 and 274.

As the dyes for the above yellow inks, for example, C.I. Direct Yellow 27, 28, 39, 50, 58, 86, 100, 142 and 144 can be employed.

As the humectant for use in the present invention, polyhydric alcohols or ethers thereof can be employed.

Specific examples of the humectant are as follows: ethylene glycol, diethylene glycol, triethylene glycol, propylene glycol, glycerol, polyethylene glycol, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and thiodiethanol.

It is preferable that that the humectant be employed in an amount of 5 to 30 parts by weight with respect to 100 parts by weight of the ink composition according to the present invention. The above humectants can be employed alone or in combination.

Furthermore, an anti-mold agent can be added to the aqueous ink composition according to the present invention.

Examples of an anti-mold agent for use in the present invention are as follows: sodium dehydroacetate, 2,2-dimethyl-6-acetoxydioxane-1,3-sodium benzoate, sodium thiosulfate, and ammonium thioglycolate.

By referring to the following examples, preferred embodiments of an aqueous ink composition according to the present invention will now be explained, together with comparative examples thereof.

EXAMPLES (1)-1

A mixture of the following components was heated to about 50° C. and stirred until completely dissolved. The mixture was then filtered through a teflon filter with a 0.22 μm mesh to yield an aqueous ink composition No. 1-1 according to the present invention.

|  | wt. % |
| --- | --- |
| Dye (1)-1 | 3.0 |
| Glycerol | 5.0 |
| Diethylene glycol | 15.0 |
| Sodium dehydroacetate | 0.3 |
| Ion-exchanged water | 76.7 |

The properties of the thus prepared aqueous ink composition were as follows:
pH=10.1 (25° C.)
Viscosity=1.95 cp (25° C.)
Surface tension=55.0 dynes/cm (25° C.)
Water resistance (indicated by fading ration)=1.5%
Light resistance (indicated by fading ratio)=1.5%

In the above, the water resistance of the ink composition indicated by fading ratio was measured as follows:

The aqueous ink composition No. 1-1 was diluted with ion-exchanged water to the extent that the concentration of the Dye (1)-1 contained in the ink composition was 1 wt.%. The thus diluted ink composition was applied to a sheet of high quality paper and was then dried at room temperature for one day to prepare a test sample. Then the density $d_0$ of the applied ink composition on the paper was measured by a Macbeth densitometer. This test sample was immersed in water at a temperature of 30° C. for one minute and was then taken out. Immediately after this, the density $d_1$ of the ink applied on the immersed paper was measured by the Macbeth densitometer. From the above measured $d_0$ and $d_1$, the resistance to water of the ink was determined in accordance with the following formula:

$$\frac{d_0 - d_1}{d_0} \times 100\%$$

The result was that the water resistance of the ink composition No. 1-1 was 1.5% in terms of the above defined fading ratio.

Likewise, the light resistance of the ink composition No. 1-1 was measured as follows:

A test sample having an applied ink density $d_0$ was prepared in the same manner as described above.

This test sample was exposed to the light of a carbon arc lamp by a fade meter at 63° C. for 3 hours and the density $d_2$ of the ink composition of the test sample was measured by the Macbeth densitometer. From the $d_0$ and $d_2$, the resistance to light of the ink composition No. 1-1 was determined by the following formula:

$$\frac{d_0 - d_2}{d_0} \times 100\%$$

The result was that the light resistance of the ink composition No. 1-1 was 1.5% in terms of the above defined fading ratio.

The aqueous ink composition No. 1-1 was then subjected to the following ink-jet performance tests:

(1) IMAGE CLARITY AND IMAGE DRYNESS TEST

The ink composition was caused to issue from a nozzle with an inner diameter of 30 μm, with vibrations at a frequency of 1100 KHz, by which vibrations the ink composition was ejected in a stream broken into individual drops, and was then caused to impinge on commercially available high quality paper. As a result, clear image without spreading were obtained on the paper. The time required for drying the printed image was not more than 10 seconds at normal room temperature and humidity.

(2) PRESERVABILITY TESTS

Samples of the ink composition were tightly sealed in glass containers and subjected to the following storage tests:
a. Preserved for 1 month at −20° C.;
b. Preserved for 1 month at 4° C.;
c. Preserved for 1 year at 20° C. and
d. Preserved for 1 week at 90° C.

Separation of precipitates from the ink composition was not observed at all in storage. In addition, no changes were detected in the properties or color of the ink composition.

(3) INK DROPLET EJECTION STABILITY TEST

The ink-jet printing as was done in the above described Image Clarity and Image Dryness Test was continuously performed for 1,000 hours. There was no evidence of either clogging of the nozzle or change in ejection direction of the ink droplets; rather, stable printing was maintained.

(4) INK DROPLET EJECTION RESPONSE TEST

After ink-jet printing was performed as outlined in (1), the apparatus and ink composition were allowed to stand for two months at room temperature and humidity, after which they were used again to perform ink-jet printing under the same conditions as previously stated in (1). As in (3) above, there was no change in the ink droplet ejection stability.

The above test was repeated in the same manner, except that the apparatus and ink composition were allowed to stand for one week at 40° C., 30% RH, instead of being allowed to stand for one month at room temperature and humidity. The result was that again no change was observed in the ink droplet ejection stability.

EXAMPLE (1)-2

With the following formulation, an aqueous ink composition No. 1-2 according to the present invention was prepared by the same procedure as in Example (1)-1:

|  | wt. % |
|---|---|
| Dye (1)-2 | 3.0 |
| Glycerol | 5.0 |
| Diethylene glycol | 15.0 |
| Sodium dehydroacetate | 0.3 |
| Ion-exchanged water | 76.7 |

EXAMPLE (1)-3

With the following formulation, an aqueous ink composition No. 1-3 according to the present invention was prepared by the same procedure as in Example (1)-1:

|  | wt. % |
|---|---|
| Dye (1)-6 | 3.5 |
| Glycerol | 5.0 |
| Diethylene glycol | 15.0 |
| Sodium dehydroacetate | 0.3 |
| Ion-exchanged water | 76.2 |

EXAMPLE (1)-4

With the following formulation, an aqueous ink composition No. 1-4 according to the present invention was prepared by the same procedure as in Example (1)-1:

|  | wt. % |
|---|---|
| Dye (1)-7 | 3.5 |
| Triethylene glycol | 20.0 |
| Sodium dehydroacetate | 0.3 |
| Ion-exchanged water | 76.2 |

EXAMPLE (1)-5

With the following formulation, an aqueous ink composition No. 1-5 according to the present invention was prepared by the same procedure as in Example (1)-1:

|  | wt. % |
|---|---|
| Dye (1)-5 | 3.0 |
| C.I. Direct Yellow 144 | 0.6 |
| Triethylene glycol | 20.0 |
| Sodium dehydroacetate | 0.3 |
| Ion-exchanged water | 76.1 |

COMPARATIVE EXAMPLE (1)-1

With the following formulation, a comparative ink composition No. 1-1 was prepared in the same manner as in Example (1)-1:

|  | wt. % |
|---|---|
| C.I. Direct Black 1 | 3.0 |
| Glycerol | 5.0 |
| Diethylene glycol | 15.0 |
| Sodium dehydroacetate | 0.3 |
| Ion-exchanged water | 76.7 |

COMPARATIVE EXAMPLE (1)-2

With the following formulation, a comparative ink composition No. 1-2 was prepared in the same manner as in Example (1)-1:

|  | wt. % |
|---|---|
| C.I. Direct Black 9 | 3.0 |
| Glycerol | 5.0 |
| Diethylene glycol | 15.0 |
| Sodium dehydroacetate | 0.3 |
| Ion-exchanged water | 76.7 |

COMPARATIVE EXAMPLE (1)-3

With the following formulation, a comparative ink composition No. 1-3 was prepared in the same manner as in Example (1)-1:

|  | wt. % |
|---|---|
| C.I. Direct Black 28 | 3.0 |
| Triethylene glycol | 20.0 |
| Sodium dehydroacetate | 0.3 |
| Ion-exchanged water | 76.7 |

The properties of the ink compositions No. 1-1 through No. 1-5 according to the present invention and the comparative ink compositions No. 1-1 to No. 1-3 are summarized in Table 1.

TABLE 1

|  | pH (25° C.) | Viscosity (CP) (25° C.) | Surface Tension (dyne/cm) 25° C.) | Water Resistance (Fading Ratio) (%) | Light Resistance (Fading Ratio) (%) |
|---|---|---|---|---|---|
| Example (1)-1 | 10.1 | 1.95 | 55.0 | 1.5 | 1.5 |
| Example (1)-2 | 10.0 | 2.00 | 53.5 | 2.0 | 1.5 |
| Example (1)-3 | 9.6 | 1.90 | 53.0 | 3.2 | 4.1 |
| Example (1)-4 | 9.8 | 1.95 | 54.5 | 2.6 | 2.3 |
| Example (1)-5 | 10.0 | 2.00 | 54.5 | 4.8 | 5.2 |
| Comparative Example (1)-1 | 9.8 | 1.98 | 52.0 | 13.0 | 5.0 |
| Comparative | 10.0 | 2.05 | 55.0 | 15.0 | 4.0 |

TABLE 1-continued

|  | pH (25° C.) | Viscosity (CP) (25° C.) | Surface Tension (dyne/cm) 25° C.) | Water Resistance (Fading Ratio) (%) | Light Resistance (Fading Ratio) (%) |
|---|---|---|---|---|---|
| Example (1)-2 |  |  |  |  |  |
| Comparative Example (1)-3 | 10.0 | 2.00 | 52.5 | 8.5 | 7.0 |

Examples (1)-2 through (1)-5 and Comparative Examples (1)-1 through (1)-3 were also subjected to the same ink droplet ejection response tests as were done in Example (1)-1. With respect to Examples (1)-2 through (1)-5, the same excellent results were obtained as in Example (1)-1. However, in Comparative Examples (1)-1 through (1)-3, the nozzles became partially clogged when the apparatus and ink were allowed to stand at normal room temperature and humidity for one week, and when the apparatus and ink were allowed to stand at 40° C./30%RH for three days, so that the direction of ejected ink droplets became extremely unstable and normal ink-jet printing was impossible.

EXAMPLES (2)-1

A mixture of the following components was heated to about 50° C. and stirred until completely dissolved. The mixture was then filtered through a teflon filter with a 0.22 μm mesh to yield an aqueous ink composition No. 2-1 according to the present invention.

|  | wt. % |
|---|---|
| Dye (2)-1 | 3.5 |
| Glycerol | 5.0 |
| Diethylene glycol | 15.0 |
| Sodium dehydroacetate | 0.5 |
| Ion-exchanged water | 76.7 |

The properties of the thus prepared aqueous ink composition were as follows:
- pH=9.9 (25° C.)
- Viscosity=1.95 cp (25° C.)
- Surface tension=54.5 dynes/cm (25° C.)
- Water resistance (indicated by fading ration)=2.0%
- Light resistance (indicated by fading ratio)=3.5%

EXAMPLE (2)-2

With the following formulation, an aqueous ink composition No. 2-2 according to the present invention was prepared by the same procedure as in Example (2)-1:

|  | wt. % |
|---|---|
| Dye (2)-3 | 4.0 |
| Glycerol | 5.0 |
| Diethylene glycol | 15.0 |
| Sodium dehydroacetate | 0.5 |
| Ion-exchanged water | 75.5 |

EXAMPLE (2)-3

With the following formulation, an aqueous ink composition No. 2-3 according to the present invention was prepared by the same procedure as in Example (2)-1:

|  | wt. % |
|---|---|
| Dye (2)-8 | 3.0 |
| Glycerol | 5.0 |
| Diethylene glycol | 15.0 |
| Sodium dehydroacetate | 0.5 |
| Ion-exchanged water | 76.5 |

EXAMPLE (2)-4

With the following formulation, an aqueous ink composition No. 2-4 according to the present invention was prepared by the same procedure as in Example (2)-1:

|  | wt. % |
|---|---|
| Dye (2)-2 | 3.0 |
| C.I. Direct Yellow 144 | 0.6 |
| Triethylene glycol | 19.0 |
| Sodium dehydroacetate | 0.5 |
| Ion-exchanged water | 76.9 |

EXAMPLE (2)-5

With the following formulation, an aqueous ink composition No. 2-5 according to the present invention was prepared by the same procedure as in Example (2)-1:

|  | wt. % |
|---|---|
| Dye (2)-4 | 2.8 |
| C.I. Direct Red 37 | 0.3 |
| C.I. Direct Yellow 144 | 0.5 |
| Triethylene glycol | 20.0 |
| Sodium dehydroacetate | 0.5 |
| Ion-exchanged water | 75.9 |

COMPARATIVE EXAMPLE (2)-1

With the following formulation, a comparative ink composition No. 2-1 was prepared in the same manner as in Example (2)-1:

|  | wt. % |
|---|---|
| C.I. Direct Black 1 | 3.5 |
| Glycerol | 5.0 |
| Diethylene glycol | 15.0 |
| Sodium dehydroacetate | 0.5 |
| Ion-exchanged water | 76.0 |

COMPARATIVE EXAMPLE (2)-2

With the following formulation, a comparative ink composition No. 2-2 was prepared in the same manner as in Example (2)-1:

|  | wt. % |
|---|---|
| C.I. Direct Black 9 | 4.0 |
| Glycerol | 5.0 |
| Diethylene glycol | 15.0 |
| Sodium dehydroacetate | 0.5 |
| Ion-exchanged water | 75.5 |

COMPARATIVE EXAMPLE (2)-3

With the following formulation, a comparative ink composition No. 2-3 was prepared in the same manner as in Example (2)-1:

| | wt. % |
|---|---|
| C.I. Direct Black 28 | 3.0 |
| Triethylene glycol | 20.0 |
| Sodium dehydroacetate | 0.5 |
| Ion-exchanged water | 76.5 |

The properties of the ink compositions No. 2-1 through No. 2-5 according to the present invention and the comparative ink compositions No. 2-1 to No. 2-3 are summarized in Table 2.

TABLE 2

| | pH (25° C.) | Viscosity (CP) (25° C.) | Surface Tension (dyne/cm) 25° C.) | Water Resistance (Fading Ratio) (%) | Light Resistance (Fading Ratio) (%) |
|---|---|---|---|---|---|
| Example (2)-1 | 9.9 | 1.95 | 54.5 | 2.0 | 3.5 |
| Example (2)-2 | 10.2 | 1.90 | 54.5 | 3.5 | 5.0 |
| Example (2)-3 | 10.0 | 1.88 | 56.0 | 2.4 | 2.5 |
| Example (2)-4 | 9.8 | 1.85 | 52.0 | 1.8 | 3.0 |
| Example (2)-5 | 10.0 | 1.95 | 54.0 | 3.5 | 3.0 |
| Comparative Example (2)-1 | 9.8 | 2.05 | 52.5 | 13.0 | 5.5 |
| Comparative Example (2)-2 | 10.1 | 2.20 | 54.0 | 16.5 | 3.8 |
| Comparative Example (2)-3 | 10.2 | 2.00 | 52.5 | 8.0 | 7.0 |

Examples (2)-1 through (2)-5 and Comparative Examples (2)-1 through (2)-3 were also subjected to the same ink droplet ejection response tests as were done in Example (1)-1. With respect to Examples (2)-1 through (2)-5, the same excellent results were obtained as in Example (1)-1. However, in Comparative Examples (2)-1 through (2)-3, the nozzles became partially clogged when the apparatus and ink were allowed to stand at normal room temperature and humidity for one week, and when the apparatus and ink were allowed to stand at 40° C./30%RH for three days, so that the direction of ejected ink droplets became extremely unstable and normal ink-jet printing was impossible.

What is claimed is:

1. An aqueous ink composition comprising:
(1) 0.5 to 30 parts by weight of a dye having the formula

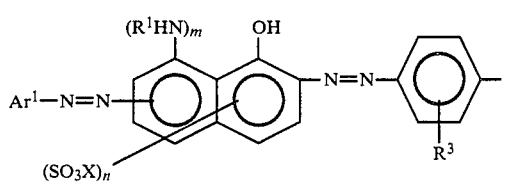

(I)

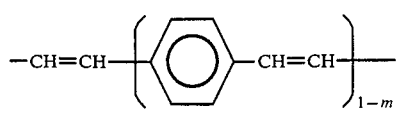

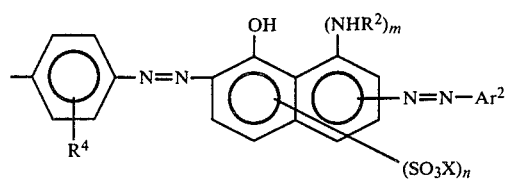

wherein
$R^1$ and $R^2$ each represent hydrogen, an alkyl group, a phenyl group, an acyl group, an acetyl group or a phenylsulfonyl group,
$R^3$ and $R^4$ each represent hydrogen, an alkyl group, an alkoxy group, halogen, a sulfonic acid group,
X represents hydrogen, Na, K, Li or an organic amine cation,
m is an integer of 0 or 1; and
when m is an integer of 0, n is an integer of 1 and $Ar^1$ and $Ar^2$ each represent a substituted phenyl group, a substituted naphthyl group, wherein the substituents on said phenyl or naphthyl groups are one or more selected from the group consisting of amino, $-N(C_2H_4OH)_2$,

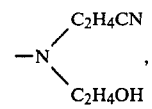

$-SO_3Na$, hydroxyl, $-COOH$, nitro, chloro, and methyl,

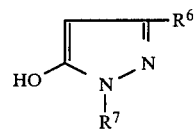

wherein $R^6$ represents an alkyl group, a phenyl group, a substituted phenyl group, a cyano group, an alkoxy group, a carboxyl group or a carbamoyl group, and $R^7$ represents a substituted phenyl group or a substituted naphthyl group, and
when m is an integer of 1, n is an integer of 1 or 2, and $Ar^1$ and $Ar^2$ each represent an unsubstituted or substituted phenyl group or naphthyl group wherein the substituents on said phenyl or naphthyl groups are one or more selected from the group consisting of amino, $-N(C_2H_4OH)_2$,

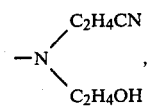

$-SO_3Na$, hydroxyl, $-COOH$, nitro, chloro, and methyl;
(2) 5 to 30 parts by weight of a humectant; and
(3) water.

2. An aqueous ink composition as claimed in claim 1, wherein said dye is selected from the group consisting of

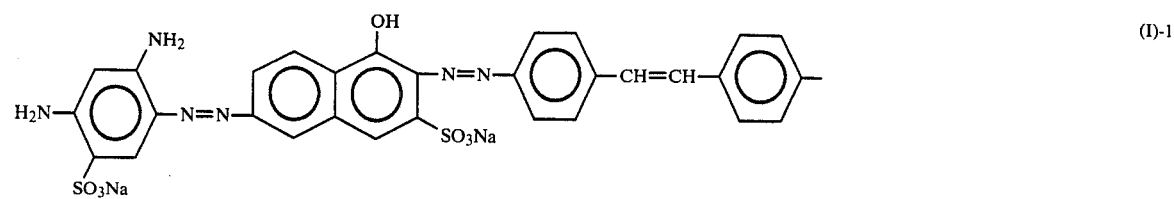 (I)-1
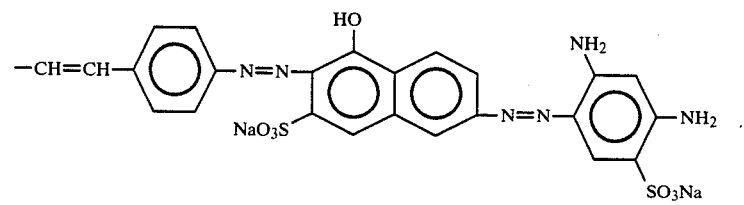
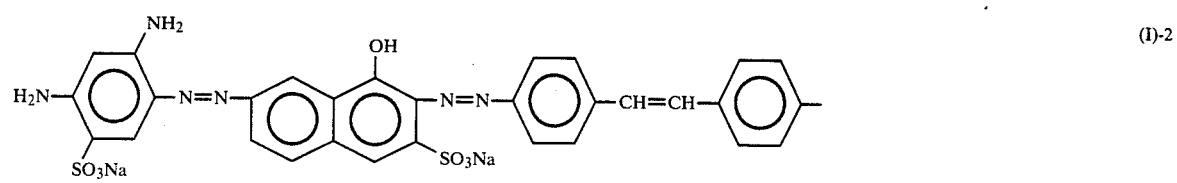 (I)-2
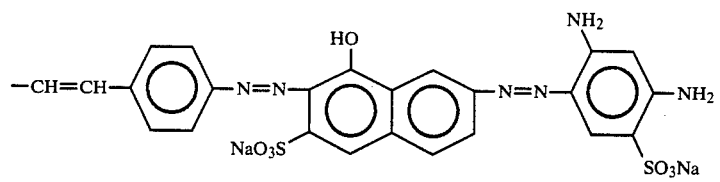
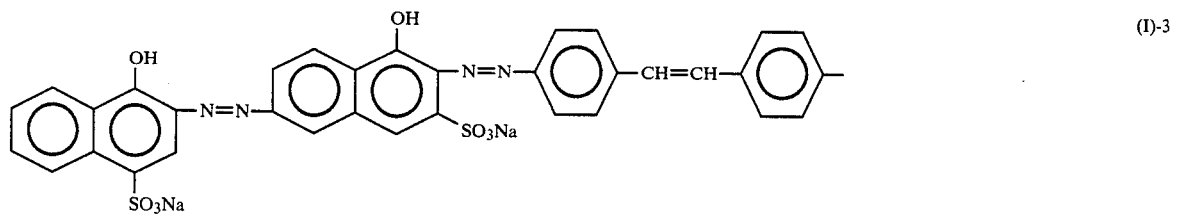 (I)-3
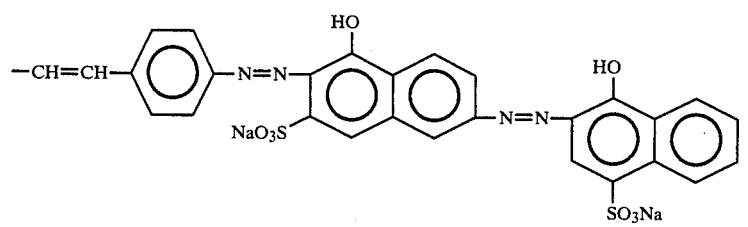
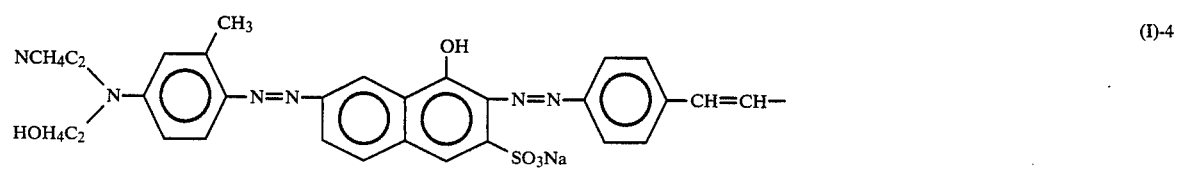 (I)-4
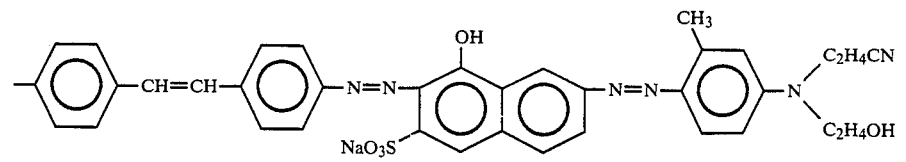

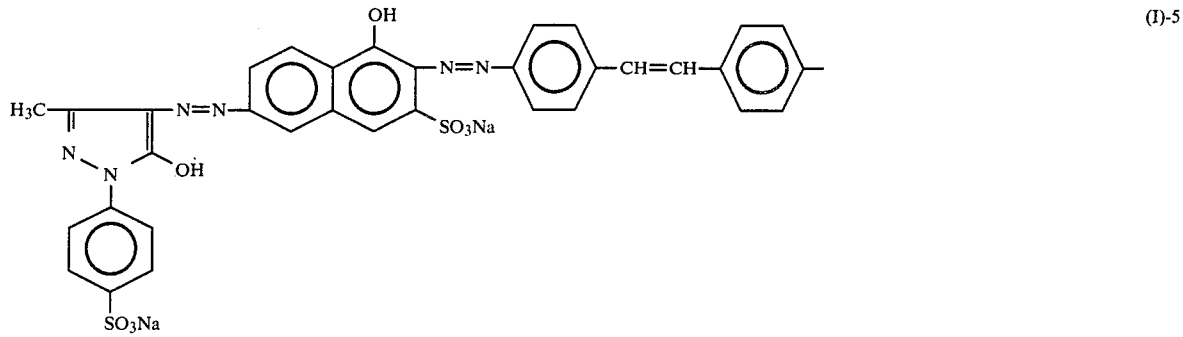
(I)-5
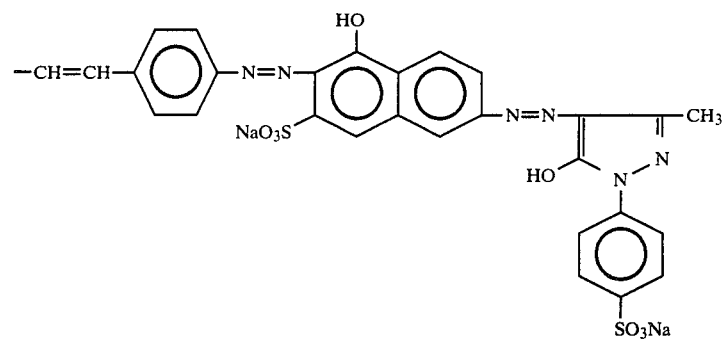
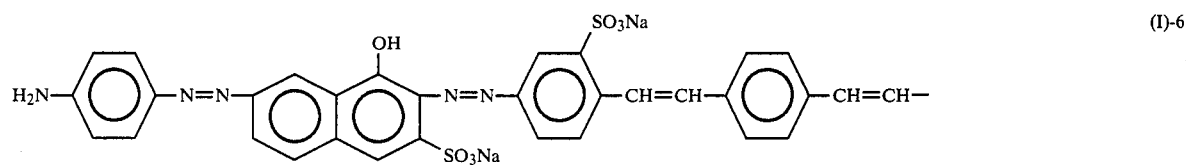
(I)-6
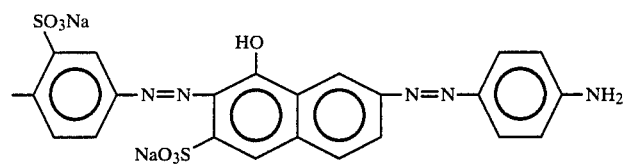
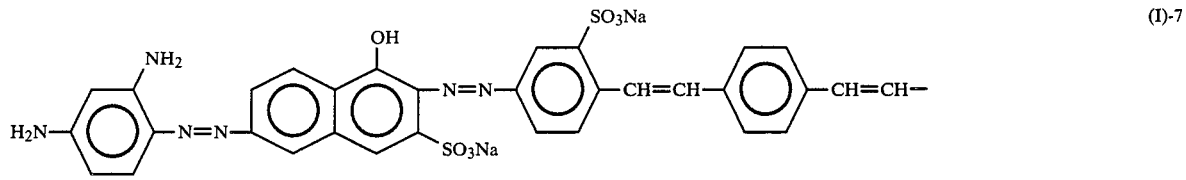
(I)-7
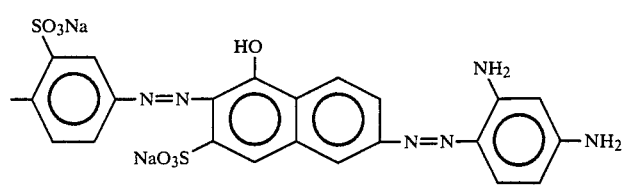

-continued
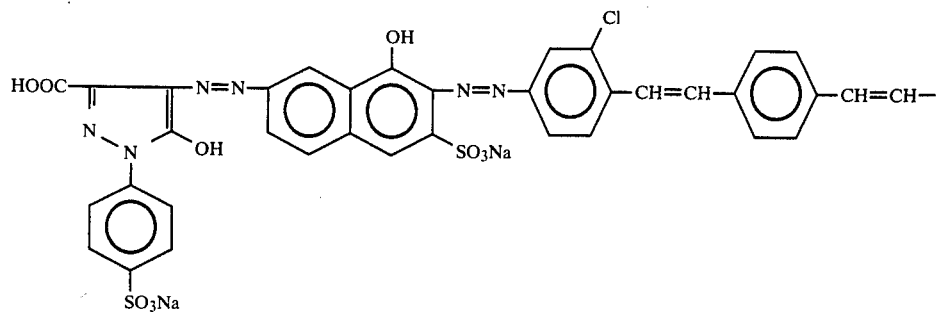
(I)-8
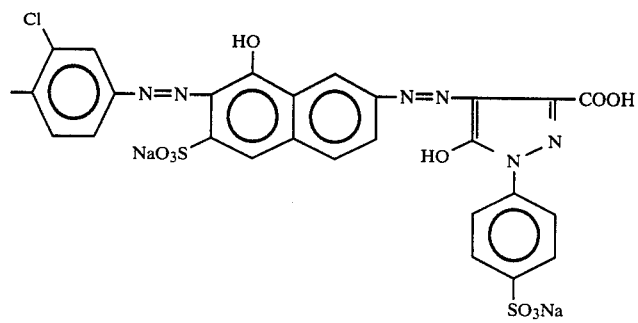
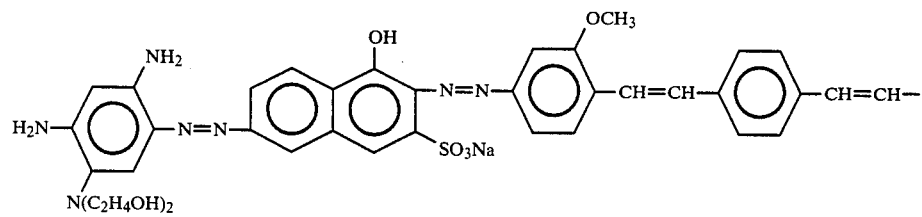
(I)-9
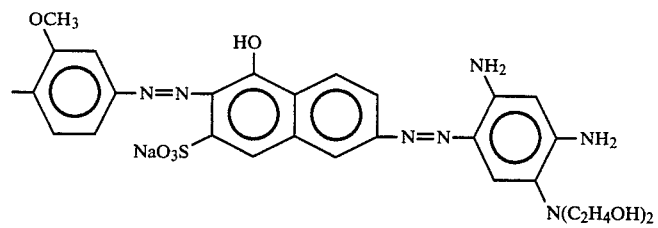
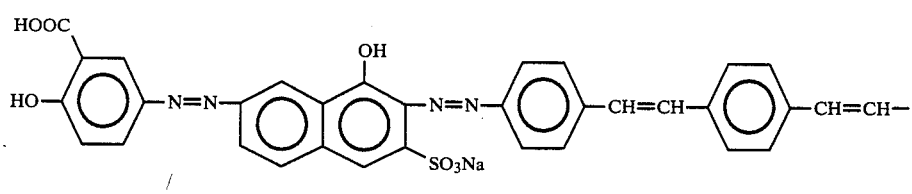
(I)-10
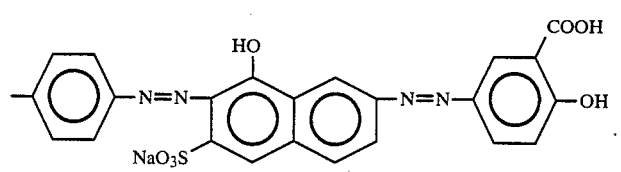
and (I)-11
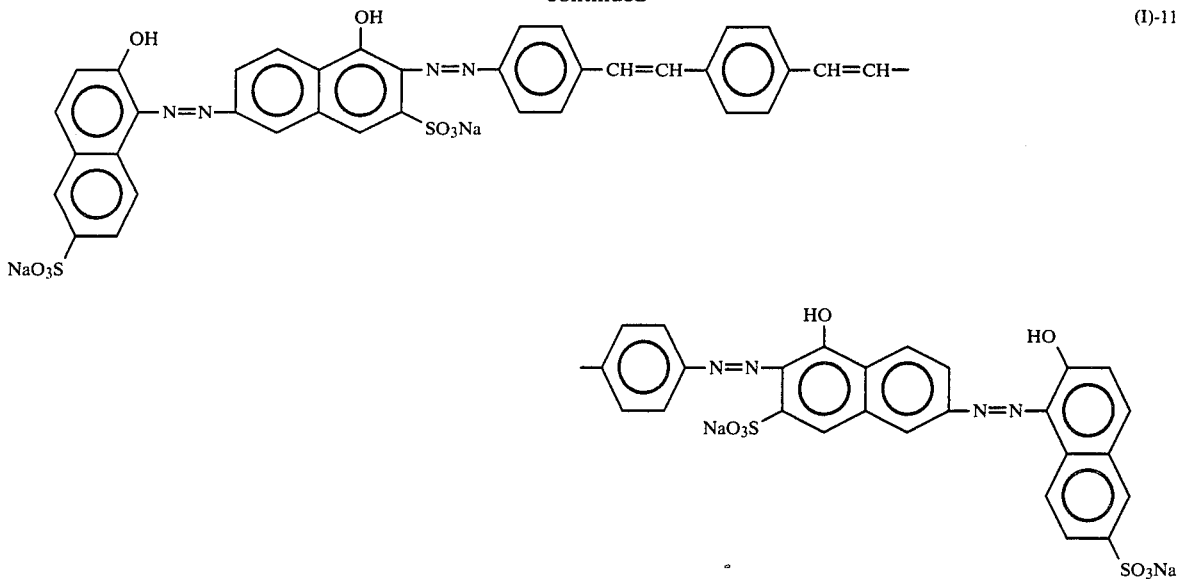
3. An aqueous ink composition as claimed in claim 1, wherein said dye is selected from the group consisting of
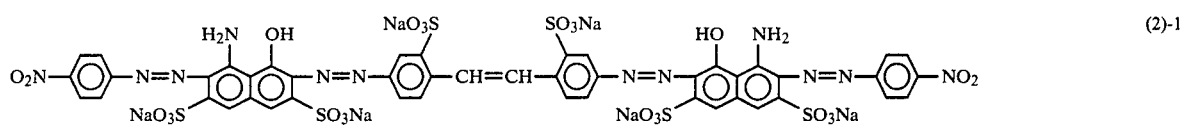 (2)-1
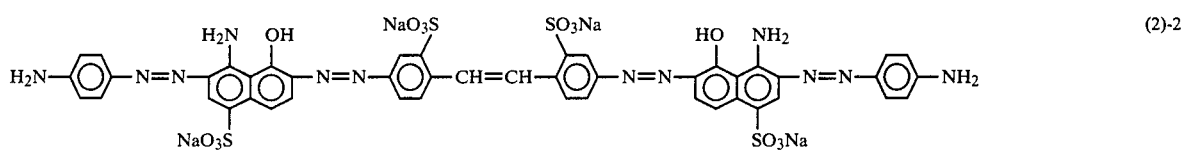 (2)-2
(2)-3
(2)-4
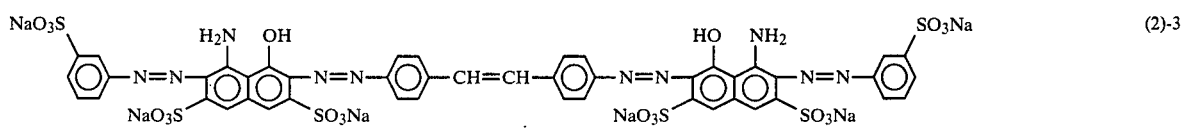 (2)-5
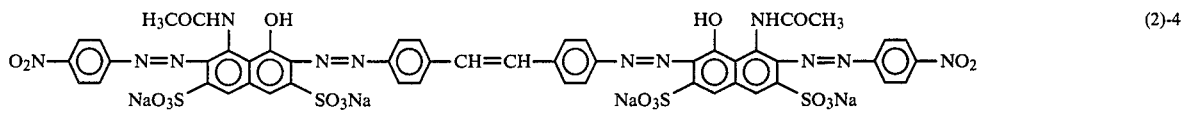 (2)-6
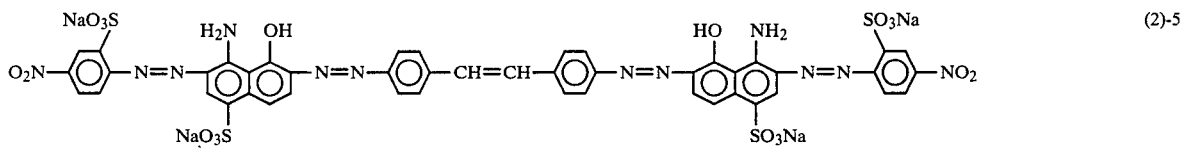 (2)-7
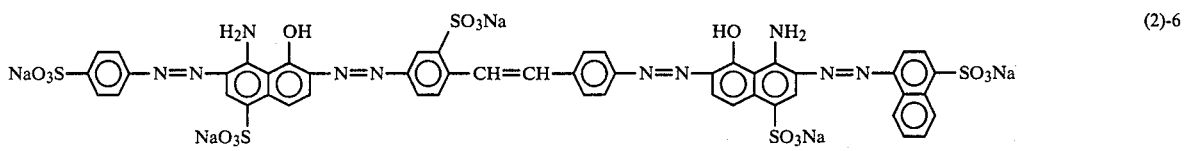
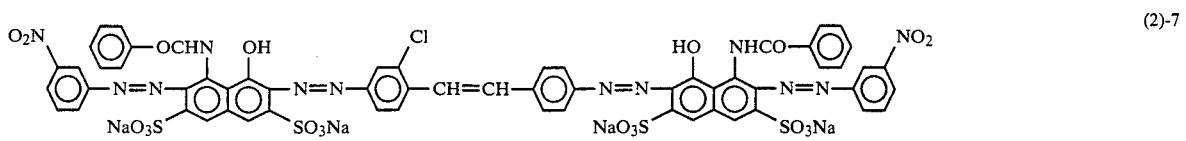

-continued

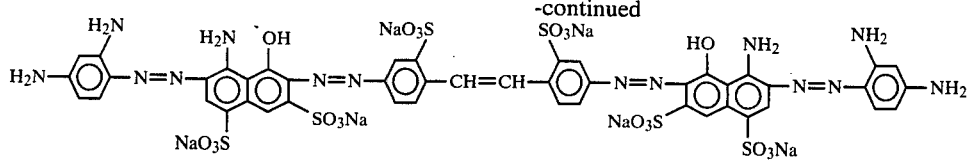 (2)-8

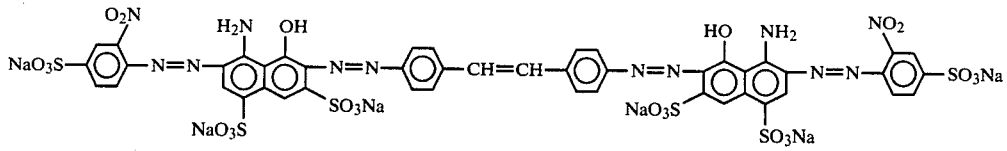 (2)-9

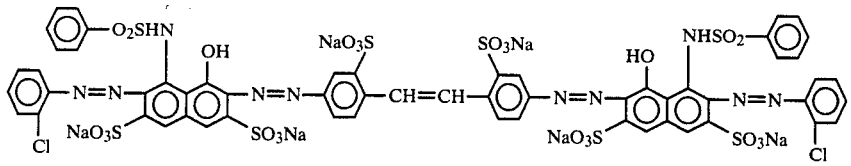 (2)-10

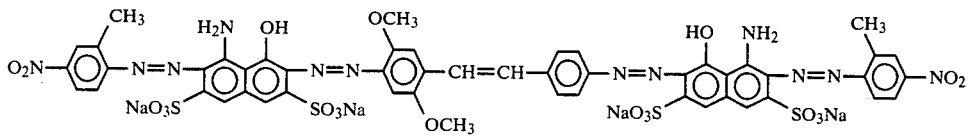 (2)-11 and

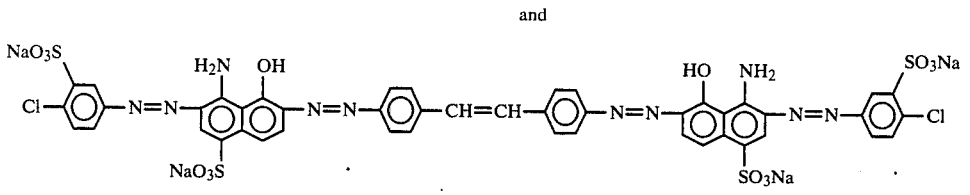 (2)-12

4. An aqueous ink composition as claimed in claim 1, further comprising a red dye and/or a yellow dye, said red dye being selected from the group consisting of C.I. Direct Red 9, 37, 63, 75, 79, 80, 81, 83, 99, 220, 224, 225, 243, 254 and 274, and said yellow dye being selected from the group consisting of C.I. Direct Yellow 27, 28, 39, 50, 58, 86, 100, 142 and 144.

5. An aqueous ink composition as claimed in claim 1, wherein said humectant is selected from the group consisting of ethylene glycol, diethylene glycol, triethylene glycol, propylene glycol, glycerol, polyethylene glycol, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and thiodiethanol.

* * * * *